No. 818,509. PATENTED APR. 24, 1906.
A. H. WOODWARD.
HUNDRED INDICATOR.
APPLICATION FILED OCT. 10, 1903.

2 SHEETS—SHEET 1.

Witnesses.
Edward T. Wray
Howard Kraft

Inventor.
Arthur H. Woodward.
by Parker & Carter
Attorneys.

No. 818,509. PATENTED APR. 24, 1906.
A. H. WOODWARD.
HUNDRED INDICATOR.
APPLICATION FILED OCT. 10, 1903.

2 SHEETS—SHEET 2.

Witnesses
Edward T. Wray
Howard L. Krafft

Inventor
Arthur H. Woodward
by Parker & Carter
Attorneys

UNITED STATES PATENT OFFICE.

ARTHUR H. WOODWARD, OF CHICAGO, ILLINOIS, ASSIGNOR TO THE INTERNATIONAL REGISTER COMPANY, OF CHICAGO, ILLINOIS, A CORPORATION OF ILLINOIS.

HUNDRED-INDICATOR.

No. 818,509.

Specification of Letters Patent.

Patented April 24, 1906.

Original application filed September 27, 1901, Serial No. 76,746. Divided and this application filed October 10, 1903. Serial No. 176,463.

*To all whom it may concern:*

Be it known that I, ARTHUR H. WOODWARD, a citizen of the United States, residing at Chicago, in the county of Cook and State of Illinois, have invented a certain new and useful Improvement in Hundreds-Indicators, of which the following is a specification.

My invention relates to indicating devices, and has for its object to provide a new and improved hundreds-indicator.

My present invention is a division of my prior application, Serial No. 76,746, filed September 27, 1901.

My invention is illustrated in the accompanying drawings, wherein—

Figure 1:
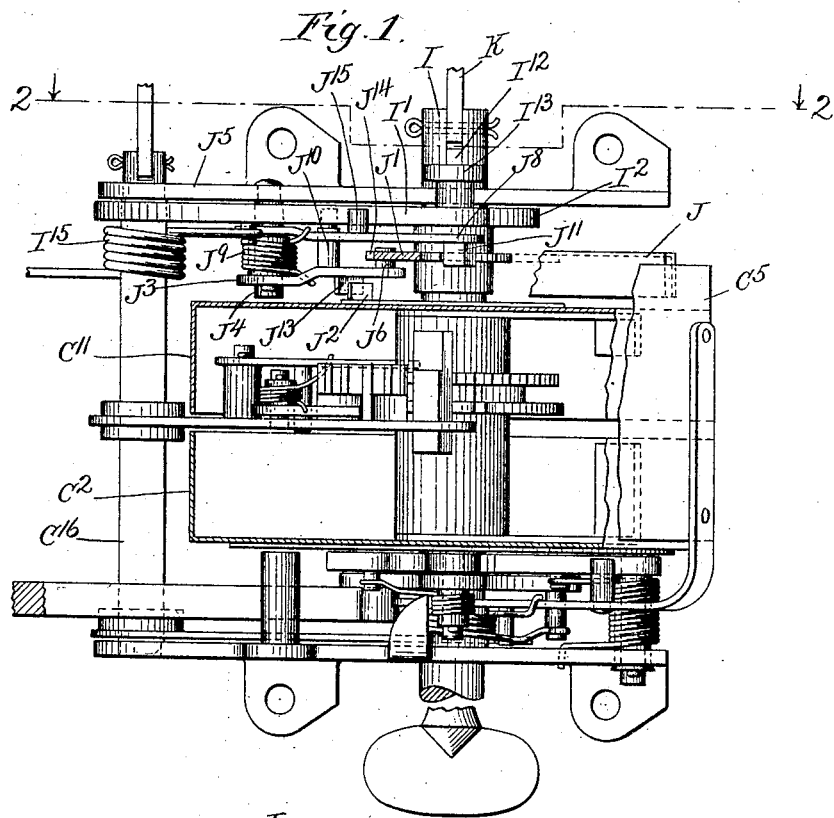
Figure 2:
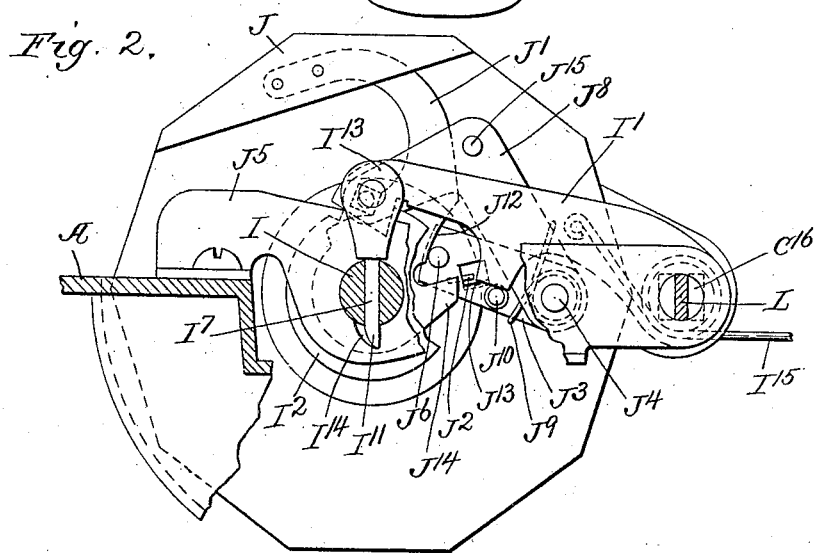
Figure 4:
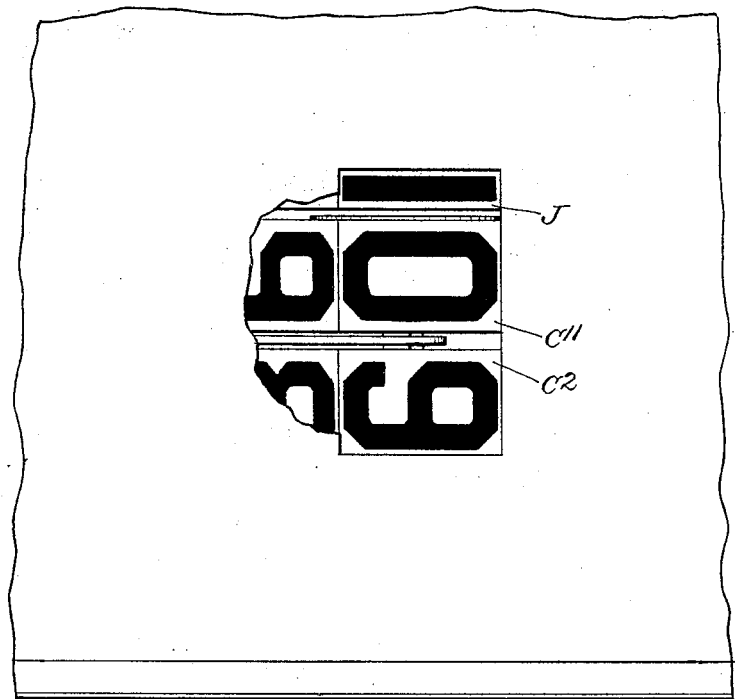
Figure 3:
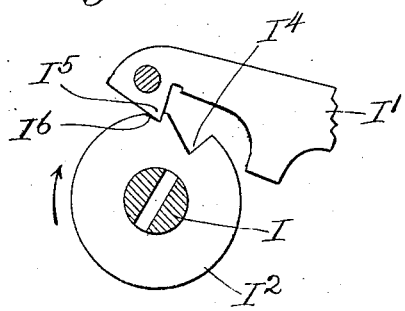
Figure 5:
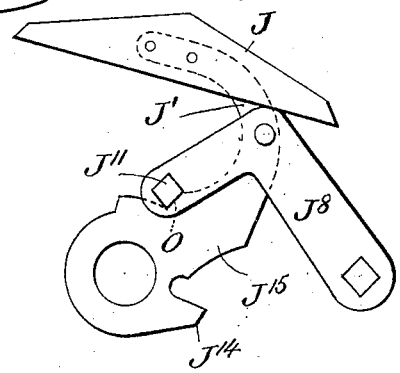

Figure 1 is a plan view, with parts omitted, of a device embodying my invention. Fig. 2 is a view taken on line 2 2, Fig. 1. Fig. 3 is a view of the cam on the resetting-shaft and the lever associated therewith. Fig. 4 is a plan view of the device, showing the hundreds-indicator in position. Fig. 5 is a view showing the hundreds-indicator and the device for holding it in its display position.

Like letters refer to like parts throughout the several figures.

My present invention is adapted to be used in connection with any kind of indicating or registering devices. For purposes of illustration I have shown it in connection with a registering device comprising a units numeral-wheel $C^2$ and a tens numeral-wheel $C^{11}$. These numeral-wheels may be rotated by any suitable mechanism—such, for example, as that illustrated in my prior application—and as this mechanism is no part of my present invention I have omitted any description relating thereto. It is understood, of course, that the tens numeral-wheel is moved one figure every time the units-wheel makes a complete revolution. The device is provided with a resetting-shaft I, which is rotated to reset the mechanism to zero. This shaft may be rotated by the thumb-piece at the end thereof.

The resetting-shaft is provided with a cam $I^2$, having a shallow notch $I^6$ and a deep notch $I^4$. A pivoted cam-lever I' is associated therewith and provided with a projection $I^5$, adapted to engage said notches. When the device is normally operating, the projection $I^5$ is in the notch $I^4$.

The hundreds-indicator is associated with the tens numeral-wheel and comprises a wing or piece J, provided with one or more figures and adapted to be moved up so as to indicate hundreds when associated with the figures on the units and tens wheels. This hundreds-wing or display device is connected to the arm J', mounted upon the resetting-shaft. The tens-wheel is provided with the projection $J^2$, which engages a projection $J^{13}$ on the arm $J^3$, mounted on the pin $J^4$, connected with the frame $J^5$. This arm $J^3$ is provided with a projection $J^6$, which engages a projection $J^{14}$ on the arm of the hundreds-wing. It will therefore be seen that when the tens-wheel is given a complete revolution the projection $J^2$ will move the arm $J^3$ so as to throw the hundreds-wing up in position. The arm of the hundreds-wing is provided with a holding-piece $J^8$, which has a suitable retracting-spring $J^9$. This holding-piece is provided with the projection $J^{11}$, which engages a notch C in the arm of the hundreds-wing when moved in position, so as to hold it in such position. In Fig. 5 I have illustrated the hundreds-indicator in its display position with the projection $J^{11}$ on the piece $J^8$ in position in the notch O in the arm J'. I have shown the part J and the hundreds-wing separated from the other mechanism in order to show the notch O. During the resetting process this holding-piece is lifted, when the cam-lever I' rides upon the periphery of the cam $I^2$, attached to the resetting-shaft I, (see Fig. 3,) so as to release the hundreds-wing, and it is retracted by the spring $J^9$, lifting the arm $J^3$, the projection $J^6$ in this position engaging the arm of the hundreds-wing, so as to throw it back.

The retracting-spring $J^9$, it will be noted, is connected at one end to the arm $J^3$ and at the other end to the holding piece or dog $J^8$. This spring therefore tends to move said two pieces in opposite directions. This motion is limited in one direction by the pin $J^{10}$, which passes beneath the holding-dog $J^8$ and engages the cam-lever I'. (See Figs. 1 and 2.) As shown in Fig. 2, the projection $J^6$ on the arm $J^3$ engages the curved face $J^{12}$ on the arm J' when the hundreds-wing is not in use, thus locking it against accidental movement. It will be seen that this prevents the hundreds-wing from being moved to its indicating or display position by the resetting of the register or by any other cause except the normal cause, due to the action of the tens-wheel. The face $J^{12}$ is preferably the arc of a circle, so as to permit the pin to move freely therealong. When the projection on the tens-wheel strikes the projection $J^{13}$ on the arm $J^3$, the projection $J^6$ is moved down so as to engage the part $J^{14}$ on the wing-arm, thus moving said wing out to its operative position. The wing is held in this position by the projection $J^{11}$ on the end of the holding-dog $J^8$.

In the process of resetting the resetting-shaft I is rotated in the direction of the arrow in Fig. 3. During the first part of this movement the projection $I^5$ rides up on the inclined face of the notch $I^4$, and the cam-lever $I'$ is thus lifted and remains in this lifted position until the shaft is given a complete revolution. The notch $I^6$ prevents the shaft from being turned backward after the resetting operation is started. The cam-lever $I'$ when lifted engages the pin $J^{15}$ on the holding-dog and lifts said holding-dog, so as to remove the projection $J^{11}$ from the notch on the wing-arm, thus releasing the arm. The arm is then thrown back by the spring $J^9$, as hereinbefore stated. It will thus be seen that the hundreds-wing is reset during the early part of the resetting process. Some means must therefore be provided for preventing the hundreds-wing from being brought to its operative position during the resetting of the tens-wheel. I produce this result by lifting the arm $J^3$ up, so that the projection $J^{13}$ will be out of the way of the projection $J^2$ on the tens-wheel. This is done during the first part of the resetting process by the pin $J^{10}$ engaging the cam-lever $I'$. As this cam-lever is lifted the arm $J^3$ is lifted with it because of the connection of the two by the spring $J^9$. It will be seen that this actuating projection $J^{13}$ is held out of the way throughout the resetting process, and when the projection on the end of the cam-lever drops into the notch on the cam the engagement of the cam-lever with the pin $J^{10}$ moves the arm $J^3$ and the holding-dog back to their normal position, this latter movement being the final movement of resetting.

I have shown a particular construction embodying my invention; but it is of course evident that such construction may be changed in many ways and that some of the parts may be omitted and others used with parts not herein shown without departing from the spirit of my invention. I therefore do not limit myself to the construction shown.

I claim—

1. The combination with a registering mechanism, provided with a hundreds-indicating device, of a resetting mechanism adapted to reset the hundreds device during the beginning of the resetting process, and means for preventing the hundreds device from being moved to its operative position during the resetting process.

2. A registering mechanism, comprising a hundreds device, adapted to indicate hundreds, an actuating device for moving the hundreds device to its indicating position when the proper number of registrations have been made, a resetting mechanism for the hundreds device, and a locking device for holding the hundreds device in its inoperative position.

3. A registering mechanism, comprising a hundreds-indicating device, an arm adapted to engage the same and move it to its indicating position when the proper number of registrations have been made, a holding-dog for holding it in such position, and a spring connected at one end to said arm and at the other end to the holding-dog, said spring also acting to return the hundreds device to its inoperative position during the resetting process.

4. A hundreds-indicator, comprising a part upon which the character is placed, an arm associated with said part, an actuating device for moving said arm to its indicating position when the proper number of registrations have been made, a holding-dog for holding said arm in said indicating position, a resetting-shaft upon which the arm of the hundreds-indicator is mounted and means for releasing said holding-dog when it is desired to reset the device.

5. The combination with a hundreds-indicator of a rotatable shaft upon which said hundreds-indicator is mounted, a cam thereon, a lever controlled by said cam, a holding part for holding the hundreds-indicator in its indicating position, and means associated therewith for engaging the cam-lever when the said shaft is turned so as to release the holding part.

6. An indicating device, comprising a supporting-arm provided with a display part, an actuating device for said arm adapted to move it to its indicating position, a separate holding device adapted to hold it in said indicating position, a releasing device for releasing said holding device, means for moving said arm to its concealed position, and a locking device for holding it in said latter position.

7. The combination with a units and a tens numeral-wheel of a hundreds device all mounted so as to move about the same axis, an actuating part for said hundreds device, provided with two projecting parts, one adapted to engage the hundreds device and the other to engage the tens-wheel, and a locking device for locking said hundreds device in its indicating position.

8. The combination with an indicating device of three movable parts, one adapted to move the hundreds device to its indicating position, another adapted to lock said hundreds device in its indicating position, and a third adapted when moved to disengage said locking part, said three parts mounted so as to move about points on the same side of the axis about which the indicating device moves.

9. The combination with an indicating device of three movable parts, one adapted to move the hundreds device to its indicating position, said two movable parts mounted upon the same axis and a third movable part adapted to lock said hundreds device in its indicating position, and a third adapted when moved to disengage said locking part, and means for moving said hundreds device to its non-indicating position when released.

10. A registering mechanism comprising a hundreds-indicating device, a resetting-shaft upon which said hundreds-indicating device is movably mounted, a pivoted actuating part for moving said hundreds-indicating device to its operative position, a locking device for locking it in this position, and a pivoted releasing-lever for releasing said locking device.

11. A registering mechanism comprising a hundreds-indicating device, an arm adapted to engage the same and move it to its indicating position when the proper number of registrations have been made, a holding device for holding it in such position, and a spring connected with said arm and holding device.

ARTHUR H. WOODWARD.

Witnesses:
HOMER L. KRAFT,
EDGAR L. CONANT.